Oct. 7, 1958   E. O. NORRIS   2,854,946
SPRAYING APPARATUS
Filed Oct. 1, 1954   2 Sheets-Sheet 1
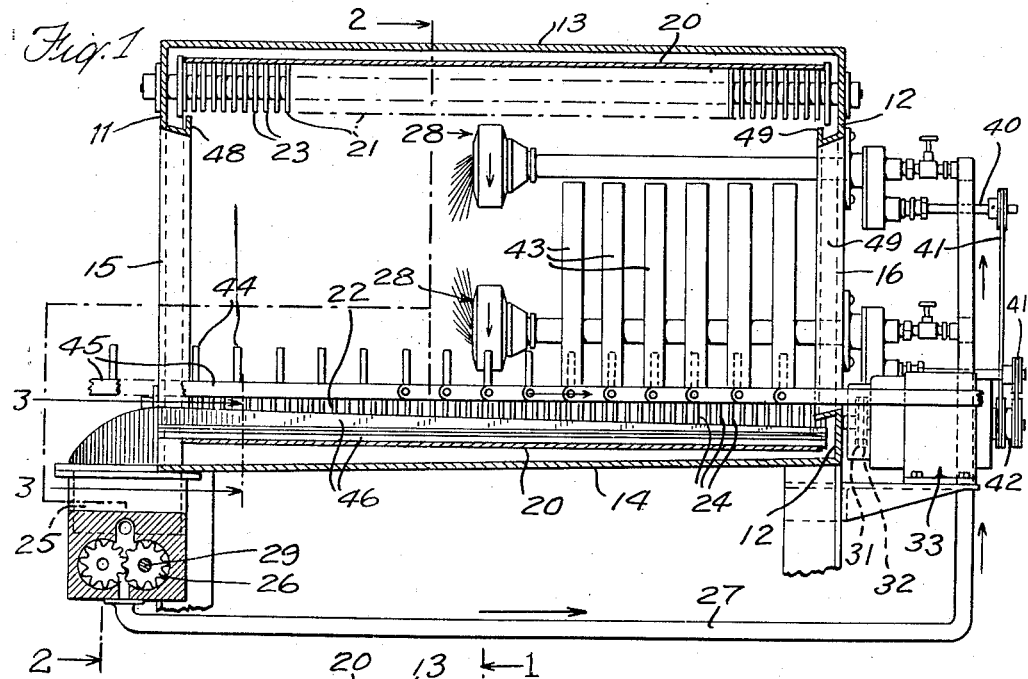
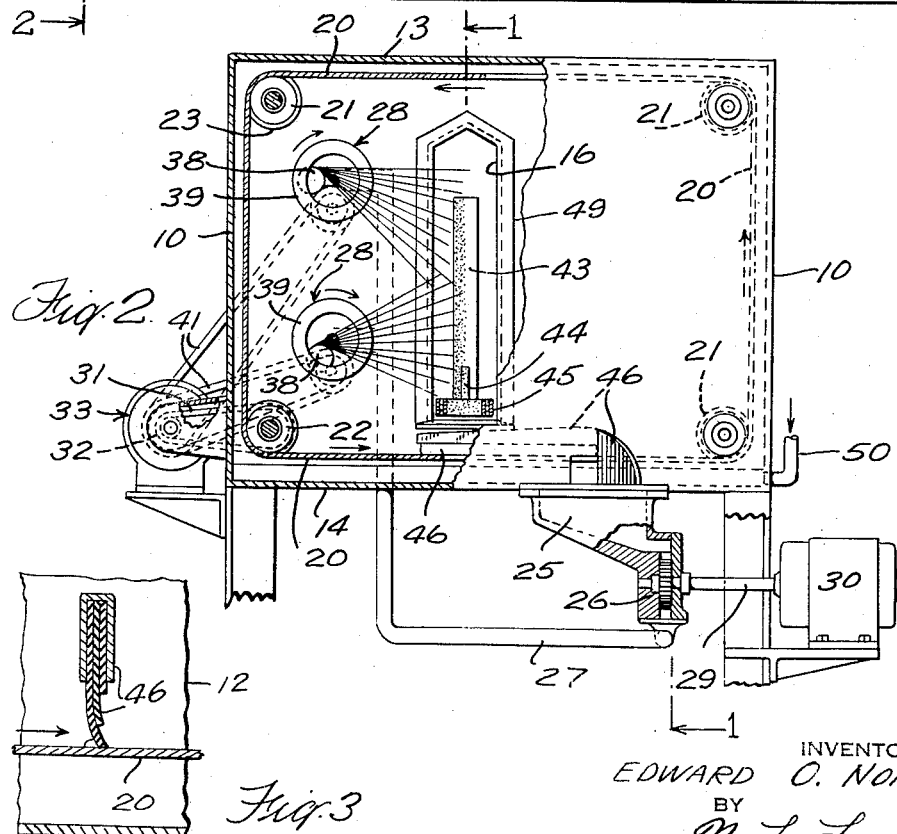
INVENTOR
EDWARD O. NORRIS
BY
N. L. Leek
ATTORNEY Oct. 7, 1958

E. O. NORRIS 2,854,946

SPRAYING APPARATUS

Filed Oct. 1, 1954

INVENTOR
EDWARD O. NORRIS
BY
N. L. Leek
ATTORNEY

United States Patent Office 2,854,946
Patented Oct. 7, 1958

2,854,946

SPRAYING APPARATUS

Edward O. Norris, Westport, Conn.

Application October 1, 1954, Serial No. 459,713

11 Claims. (Cl. 118—324)

This invention relates to spraying apparatus and more particularly to an apparatus for spraying articles which are capable of being fed into a spraying chamber.

An object of the invention is to provide, in an apparatus of the above type, novel and improved means for preventing the spray from collecting on the walls of the chamber above the articles being sprayed and dripping from said walls onto the said articles.

Other objects and advantages will be apparent as the nature of the invention is more fully disclosed.

The novel features which are characteristic of this invention will be better understood by referring to the following description taken in connection with the accompanying drawings in which a specific embodiment thereof has been set forth for purposes of illustration.

In the drawings:

Fig. 1 is a vertical section of a spraying apparatus embodying the present invention taken on the line 1—1 of Fig. 2;

Fig. 2 is a partial transverse section taken on the line 2—2 of Fig. 1;

Fig. 3 is an enlarged section taken on the line 3—3 of Fig. 1 showing the construction of the wiper;

Figure 4:
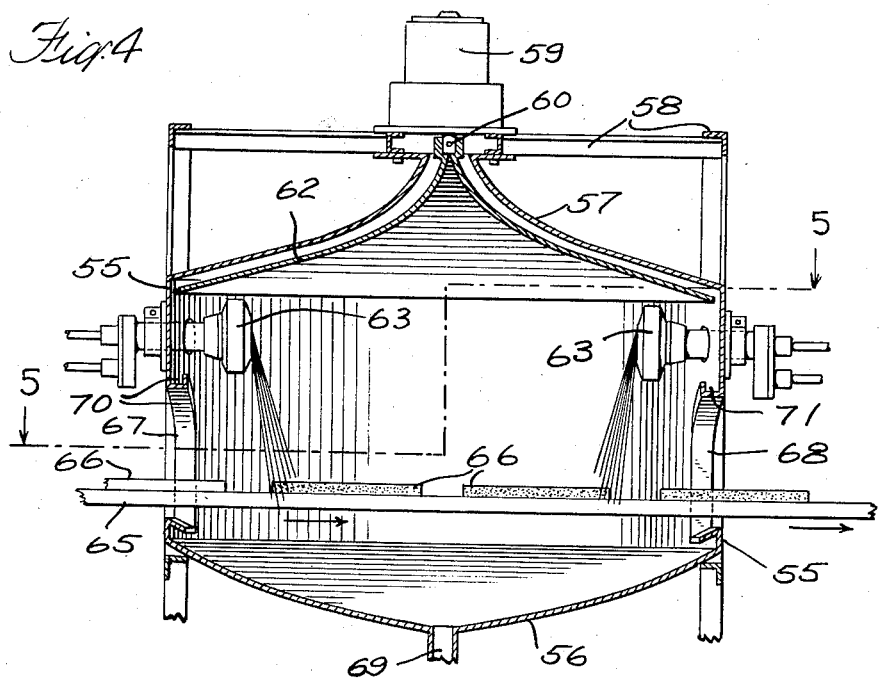
Fig. 4 is a longitudinal section illustrating a further embodiment of the invention.

Referring to the drawings more in detail the invention is shown in Figs. 1 to 3 as embodied in an apparatus comprising side walls 10, end walls 11 and 12, top wall 13 and bottom wall 14 forming a spray chamber which is closed except for openings 15 and 16 in end walls 11 and 12 respectively for the passage of articles to be sprayed.

Within the spray chamber is a traveling impervious belt 20 which is of a width to substantially span the top wall 13 and is guided around the inside of the chamber adjacent the side walls 10, top wall 13 and bottom wall 14 by a series of idler rollers 21 and a drive roller 22 disposed respectively at the four corners of the chamber. The rollers 21 are shown in Fig. 1 as composed of a plurality of spaced disks 23 and the roller 22 is composed of a similar set of spaced disks 24 so as to reduce the area of contact with the belt 20.

The bottom wall 14 slopes toward a drain sump 25 for the collection of oversprayed material. The sump 25 is connected to the intake side of a gear pump 26 discharging through a pipe 27 to supply spray liquid to spray heads 28 which are mounted within the spray chamber. The gear pump is driven by shaft 29 of a motor 30.

The drive roller 22 is driven by a belt 31 from a pulley 32 on the shaft of a motor 33.

The spray heads 28 are shown as of the centrifugal type having a rotating distributor 38 dipping into a peripheral film of liquid held centrifugally in a rotating case 39, the features of which are shown more in detail in my copending application Serial No. 363,551, filed June 23, 1953, for Spraying Apparatus. The rotating case 39 is driven by suitable gears (not shown) from a shaft 40. The various spray heads are driven by belts 41 from pulley 42 on the shaft of the motor 33.

The spray heads 28 are shown as mounted in vertically spaced relationship on one side of the chamber and oriented so as to direct the spray toward one side of a series of articles 43 which are shown as carried on pins 44 attached to a conveyor 45 which extends through the end openings 15 and 16 and is driven by suitable means (not shown). It is obvious however that the spray heads can be located as desired for directing a spray onto suitable portions of the articles as they advance through the spray zone and that other types of spray means such as the air gun type of spray head for atomizing spray material may be used if desired.

Since the spray chamber is filled with an atomized spray, particles will collect on the exposed wall surfaces and will tend to drip therefrom onto the articles being sprayed. In the present case the belt 20 shields the surface of the top wall 13 so that any spray which normally would strike the top wall 13 or side walls 10 is intercepted by the belt 20 and is carried away from the spray area before it can collect into large globules and drip onto the articles being sprayed. As this spray material is carried by the belt 20 over the drain sump 25 it is removed from the belt by a wiper 46 which extends entirely across the belt and is disposed at an angle to feed the material across the belt and into the sump 25. Any oversprayed material which is collected on the bottom 14 also passes into the sump 25 for respraying.

The rate of feed of the belt 20 is selected so that the material is removed from the spray zone before it has an opportunity to agglomerate and drip onto the articles 43. This permits the apparatus to be adapted for use with various different types of spray material. Drip channels 48 and 49 are disposed around the openings 15 and 16 to catch any drippings from the end walls 11 and 12 and to feed the same downwardly on opposite sides of the conveyor 45 so that this material is likewise prevented from dripping onto the articles 43 being sprayed. Fresh material to replenish the spray which is removed as a coating on the articles may be fed into the spray chamber by pipe 50.

Figure 5:
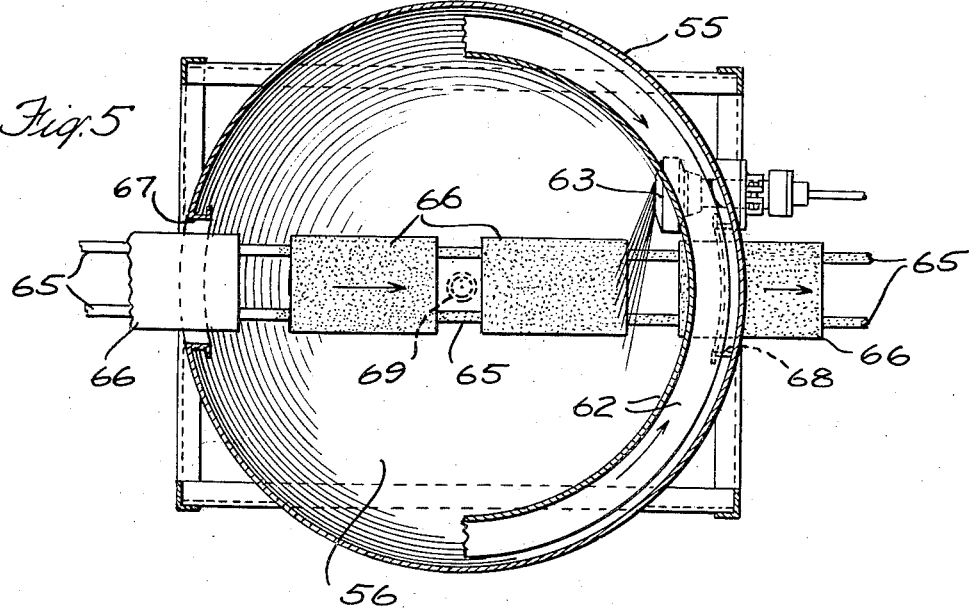
Fig. 5 is a horizontal section taken on the line 5—5 of Fig. 4.

Referring to the embodiment of Figs. 4 and 5 the spray chamber is shown as circular in horizontal section and as formed by an annular side wall 55, a dished bottom wall 56 and a concave cone-shaped top wall 57 supported by a frame 58. The frame 58 carries a motor 59 having a vertical shaft 60. Beneath the top wall 57 is a similar concave conical wall 62 which is attached to the shaft 60 of the motor 59. The conical wall 62 substantially covers the entire top area of the spray zone. The walls 57 and 62 are shown as concave in section although they may be made straight if desired.

A pair of spray heads 63 extend through the annular wall 55 and are disposed within the spray chamber. The spray heads 63 may be of the centrifugal type as above described or may be of the air gun type. A conveyor 65 feeds articles 66 for spraying through openings 67 and 68 in the annular wall 55 of the spray chamber. The oversprayed material is collected on the dished bottom wall 56 and may be removed through a pipe 69 for recirculation to the spray heads 63 as above described in connection with Figs. 1 and 2.

In this embodiment as in the form of Figs. 1 and 2, the top wall above the articles being sprayed is movable for removing the spray which collects thereon from above such articles. The conical wall 62 is driven by the motor 59 at a rate such that any spray material which collects on the under surface of the wall 62 flows downwardly along the undersurface thereof and outwardly by centrifugal force and is discharged beyond the area of the articles being sprayed. Spray channels 70 and 71 are disposed around the openings 67 and 68 to collect any spray material which flows downwardly above said openings and to prevent the same from dripping from the annular wall onto the articles as they pass into or out of the spray chamber. The speed of the rotation of the cone-shaped top wall 62 is so selected that the spray material is removed from the walls before it accumulates and drips from the surface thereof onto the articles which are being sprayed.

Although specific embodiments of the invention have been shown for purposes of illustration it is to be understood that various changes and adaptations may be made therein as will be apparent to a person skilled in the art.

What is claimed is:

1. Apparatus for spraying articles comprising a substantially closed stationary spray chamber, conveyor means for feeding articles to be sprayed into and out of said chamber on a horizontal path, a spray head disposed in said chamber above said conveyor means for directing a spray material onto said articles as they pass through said chamber, means including a movable wall, disposed above said spray head and covering the entire area above the path of articles passing through said chamber, to intercept spray particles in the zone above said articles and means for continuously moving said wall during spraying at a speed sufficient to remove said particles away from the zone above said articles before said particles agglomerate and drip onto said articles.

2. Apparatus for spraying articles comprising a substantially closed spray chamber, means for feeding articles to be sprayed into and out of said chamber, a spray head in said chamber for directing a spray material onto said articles as they pass therethrough, a rotatable conical wall disposed above the path of said articles as they pass through said chamber to intercept the spray particles in the spray zone above said articles, means mounting said conical wall for rotation about a vertical axis for removing intercepted spray material outwardly by centrifugal force and discharging the same beyond the path of said articles so as to prevent said spray particles from agglomerating on said wall and dripping onto said articles.

3. Apparatus for spraying articles comprising a substantially closed spray chamber, means for feeding articles to be sprayed into and out of said chamber, a spray head in said chamber for directing a spray material onto said articles as they pass through said spray chamber, a rotatable wall disposed above the path of said articles as they pass through said chamber to intercept the spray particles in the spray zone above said articles, means mounting said wall for rotation about a vertical axis for removing intercepted spray material outwardly by centrifugal force and discharging the same beyond the path of said articles so as to prevent said spray particles from agglomerating on said wall and dripping onto said articles.

4. Apparatus for spraying articles as defined in claim 3 in which said rotatable wall disposed above the path of said articles comprises a circular member having the lower peripheral edge thereof disposed in a plane perpendicular to the axis of rotation of said wall.

5. Apparatus for spraying articles comprising side, bottom and top walls forming a substantially closed stationary spray chamber, means for feeding articles to be sprayed into and out of said chamber, a spray head disposed in said chamber above said conveyor means for directing a spray material onto said articles as they pass through said chamber, an endless belt having a flight disposed beneath said top wall above said spray head and covering the entire path of said articles in said chamber to intercept spray particles in the zone above said articles, and means for continuously moving said belt during spraying at a speed sufficient to convey said intercepted particles away from the zone above said articles before said particles have had time to agglomerate and drip onto said articles.

6. Apparatus for spraying articles as defined in claim 5 in which means is provided to remove spray material from the surface of said belt as it advances.

7. Apparatus for spraying articles as defined in claim 6 in which drain means for collecting oversprayed material which is deposited on said bottom wall and for recycling said material to said spray head are provided.

8. Apparatus for spraying articles as defined in claim 5 in which a transversely extending drip channel is secured to the inner face of each of said side walls above the path of the articles and which channels extend inwardly in said chamber and under the adjacent edge of the said flight of said endless belt.

9. Apparatus for spraying articles comprising side, bottom and top walls forming a substantially closed stationary spray chamber, conveyor means for feeding articles to be sprayed into and out of said chamber on a horizontal path, a spray head disposed in said chamber above said conveyor means for directing a spray material onto said articles as they pass through said chamber, an endless belt disposed in said chamber transversely of the path of articles being conveyed through said chamber by said conveyor means with the upper flight of said belt disposed beneath said top wall above said spray head and covering the entire area above the said path of articles being conveyed through said chamber and with the lower flight of said belt disposed under said conveyor means, the underside of the said top flight of said endless belt being operative to intercept spray particles in the zone above the path of said articles, and means for continuously advancing said belt during spraying at a speed sufficient to convey said intercepted particles away from the said zone above the path of said articles before said particles have had time to agglomerate and drip onto said articles.

10. Apparatus for spraying articles as defined in claim 9, in which means is provided to remove intercepted spray material from the upper surface of the said lower flight of said belt as it is being advanced.

11. Apparatus for spraying articles as defined in claim 9, in which a transversely extending drip channel is secured to each of said side walls above the said path of articles being conveyed through said chamber, said channels extending inwardly in said chamber under the adjacent edges of the said upper flight of said endless belt.

References Cited in the file of this patent

UNITED STATES PATENTS

| | | |
|---|---|---|
| 2,106,187 | Naugler | Jan. 25, 1938 |
| 2,210,927 | Hickman | Aug. 13, 1940 |
| 2,259,626 | Erikson | Oct. 21, 1941 |
| 2,343,668 | Hickman | Mar. 7, 1944 |
| 2,400,315 | Paasche | May 14, 1946 |
| 2,509,276 | Ransburg et al. | May 30, 1950 |
| 2,674,167 | Edwards | Apr. 6, 1954 |